United States Patent [19]

Kuo et al.

[11] Patent Number: 5,576,371
[45] Date of Patent: Nov. 19, 1996

[54] CORROSION-RESISTANT COATING COMPOSITION HAVING HIGH SOLIDS CONTENT

[75] Inventors: Ming C. Kuo, Fox Point, Wis.; Staer S. Kirsten, Copenhagen, Denmark; Gary W. Marshall, Advance, N.C.

[73] Assignee: A. O. Smith Corporation, Milwaukee, Wis.

[21] Appl. No.: 375,030

[22] Filed: Jan. 19, 1995

[51] Int. Cl.$^6$ .................................................. C08G 59/24
[52] U.S. Cl. .......................... 524/413; 524/414; 524/424; 524/442; 524/539; 524/601; 525/438; 525/411; 525/415
[58] Field of Search .................... 525/438, 411; 428/458, 482; 524/539, 601, 413, 414, 424, 442

[56] References Cited

U.S. PATENT DOCUMENTS

| | | | |
|---|---|---|---|
| 5,087,286 | 2/1992 | Fukuda | 525/440 |
| 5,330,850 | 7/1994 | Suzuki | 428/623 |
| 5,362,519 | 11/1994 | Argyropoulos | 525/437 |

*Primary Examiner*—Patricia A. Short
*Attorney, Agent, or Firm*—Jeffrey D. Hunt

[57] ABSTRACT

A coating composition for preventing corrosion of a substrate including corrodable material, the coating composition comprising: a cycloaliphatic epoxy compound; a polyester compound; and a catalyst.

12 Claims, 1 Drawing Sheet

CORROSION-RESISTANT COATING COMPOSITION HAVING HIGH SOLIDS CONTENT

BACKGROUND OF THE INVENTION

1. Field of the Invention

The invention relates to coatings for preventing corrosion of carbon steel motor vehicle frame members and the like.

2. Discussion of Prior Art

Motor vehicle frame members typically consist of a substrate of corrodable material such as carbon steel. Since the frame members are exposed to a corrosive environment, the carbon steel substrate is coated with a composition which prevents or resists corrosion of the carbon steel. In order to prevent or resist corrosion, the coating must be resistant to moisture. The coating composition should also be suitable for application to the carbon steel substrate in an inexpensive, high rate production process, and in particular should be suitable for application by dipping the carbon steel member in the composition.

Wax-based compositions are resistant to moisture and corrosion and can be applied by dipping the carbon steel member therein, and thus are typically utilized to form such corrosion resistant coatings. Typically, the wax-based composition is applied in a thickness of about 4 mils by dipping the carbon steel substrate in the heat-melted liquid composition and then permitting the coated substrate to cool and form a solid coating.

SUMMARY OF THE INVENTION

Coatings of wax-based compositions typically are soft and can be inadvertently scraped off the substrate, and are susceptible to chipping and cracking upon impact with road debris such as gravel. Coatings of wax-based compositions may even further soften during periods of hot weather.

Other coating compositions typically include one or more volatile organic compounds. When the composition is applied and cured, the volatile organic compounds vaporize and are emitted into the air. Thus, the air must be treated to remove or destroy the volatile organic compounds.

Other coating compositions also typically include one or more heavy metals such as lead or chromium, and unused portions of the composition must be disposed of or recycled in a manner preventing environmental contamination by the heavy metals.

Other coating compositions typically have a short pot-life or are otherwise unsuitable for application in a high rate production process.

A corrosion resistant coating may be exposed to elevated temperatures, especially in the vicinity of the engine of a motor vehicle, and thus should be stable upon exposure to elevated temperatures.

A corrosion resistant coating may be exposed to different weather conditions, and thus should be stable upon exposure to different weather conditions.

The invention provides a corrosion resistant composition which can be applied in a high rate production process by dipping the substrate therein. The composition has a 100% solids content and thus does not include volatile organic compounds. The composition also does not include heavy metals. The composition forms a coating which is hard, impact resistant and stable upon exposure to elevated temperatures and different weather conditions.

More particularly, the invention provides a coated member including a substrate of corrodable material such as carbon steel and a coating of a composition which prevents corrosion of the corrodable material. In one embodiment, the composition includes a cycloaliphatic epoxy compound, polyester compounds, a functional polyol and a catalyst. The composition may also include an adhesion promoter, pigment, a corrosion inhibitor, a flow agent, an anti-sag agent and a defoamer.

The composition includes from about 35% to about 80% by weight of a cycloaliphatic epoxy compound, such as 3,4 epoxycyclohexymethyl-3,4 epoxycyclohexane-carboxylate. The composition also includes from about 5% to about 40% of polyester compounds, preferably in the form of powder. The composition includes from about 5% to about 40% by weight of a functional polyol compound, such as polycaprolactone diol. The composition also includes from about 0.1% to about 2% by weight of a catalyst, such as a triflic acid. In one embodiment, the triflic acid is the diethylammonium salt of trifluoromethanesulfonic acid $(CF_3SO_3H \cdot HNCC_2H_5)_2$.

The composition can include from about 0.1% to about 5% by weight of an adhesion promoter, such as a titanate compound. The composition can also include from about 1% to about 5% by weight of a pigment, such as carbon black. The composition can also include from about 5% to about 50% by weight of a corrosion inhibitor, such as a mixture of iron phosphide ($Fe_2P$) and iron silicide (FeSi). The composition 14 can also include from about 0.01% to about 2% by weight of a flow agents, such as a siloxane. The composition can include from about 0.25% to about 10% by weight of an anti-sag agent, such as a high hydroxy-containing compound. The composition can also include from about 0.05% to about 5% by weight of a defoamer, such as a siloxane.

The composition can be applied to the carbon steel substrate in any suitable manner, such as by dipping the substrate into the liquid composition. The composition includes no volatile organic compounds, and thus does not emit volatile organic compounds into the air. The composition also does not include heavy metals. The dipped substrate is removed from the composition and heated at an elevated temperature to cure the composition. The coating of the cured composition is resistant to moisture, is hard, is impact resistant and is stable upon exposure to high temperatures and different weather conditions.

Other features of and advantages of the invention will become apparent to those skilled in the art upon review of the following detailed description, claims, and drawings.

Figure 1:
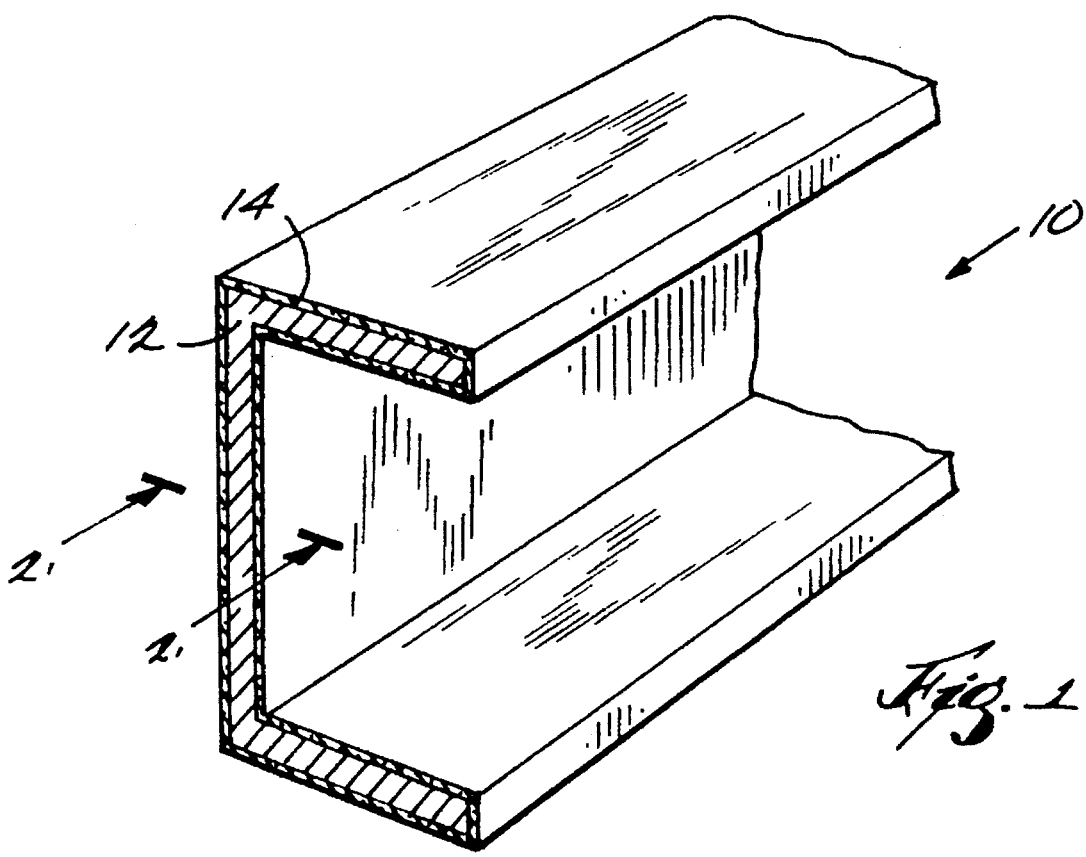
FIG. 1 is a partial perspective view of a coated vehicle frame member embodying various features of the invention.
Figure 2:
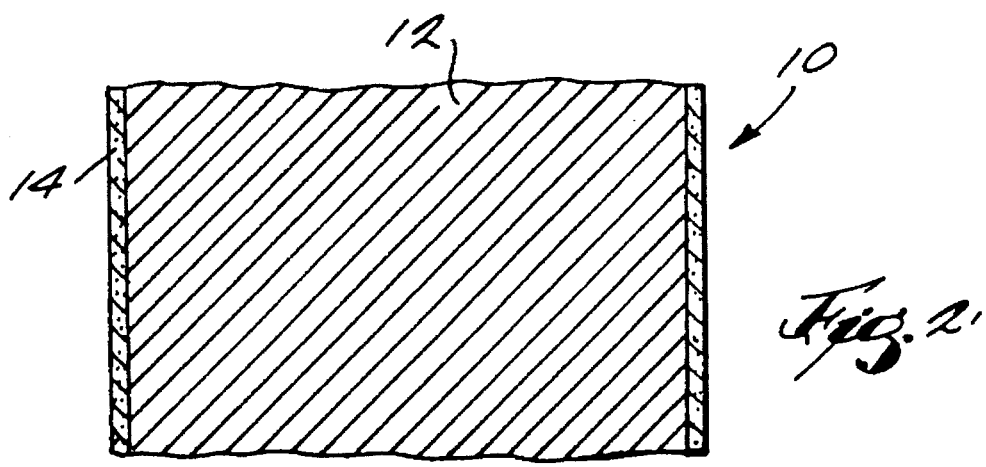
FIG. 2 is a cross sectional view taken along line 2—2 in FIG. 1.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF A PREFERRED EMBODIMENT

Illustrated in FIG. 1 is a coated member 10 embodying various features of the invention. Although coated members embodying the invention can be used in a variety of applications, in the illustrated embodiment the member 10 is a motor vehicle frame member. The member 10 includes a substrate 12 of corrodable material such as carbon steel. The member 10 also includes an outer coating of a composition 14. The composition 14 is resistant to moisture and prevents corrosion of the corrodable material 12.

The composition 14 includes a cycloaliphatic epoxy compound, polyester compounds, a functional polyol and a catalyst. The composition may also include an adhesion promoter, pigment, a corrosion inhibitor, a flow agent, an anti-sag agent and a defoamer. In one embodiment, the composition includes a cycloaliphatic epoxy compound, polyester compounds, a functional polyol, a catalyst, an adhesion promoter, pigment, a corrosion inhibitor, a flow agent, an anti-sag agent and a defoamer.

The composition 14 includes from about 35% to about 80% by weight of a cycloaliphatic epoxy compound, based upon the total weight of the composition. In one embodiment, the composition includes about 64% of a cycloaliphatic epoxy compound. In one embodiment, the cycloaliphatic epoxy compound is 3,4 epoxycyclohexymethyl-3,4 epoxycyclohexanecarboxylate. A suitable commercially available product is ERL 4221 (Union Carbide; Danbury, Conn.). In other embodiments, different cycloaliphatic epoxy compounds can be used. Preferably, the composition includes about 64% of 3,4 epoxycyclohexymethyl-3,4 epoxycyclohexanecarboxylate.

The composition 14 includes from about 5% to about 40% by weight of polyester compounds, based upon the total weight of the composition. In one embodiment, the composition includes about 5% of polyester compounds. In one embodiment, the polyester compounds are in the form of a non-volatile liquid. Preferably, the polyester compounds are in the form of powder. A suitable commercially available product is Reichhold 8076 Fineclad® (Reichhold; Triangle Park, N.C.). Reichhold 8076 Fineclad® is a mixture of polyester compounds in the form of powder. The mixture of polyester compounds in Reichhold 8076 Fineclad® has an average molecular weight of about 14,000 and includes hydroxy functional groups. Most preferably, the composition includes about 5% of Reichhold 8076 Fineclad®.

The composition 14 includes from about 5% to about 40% by weight of a functional polyol compound, based upon the total weight of the composition. In one embodiment, the composition includes about 16% of a functional polyol compound. Preferably, the functional polyol compound is di-functional or tri-functional. More preferably, the functional polyol compound is polycaprolactone diol. A suitable commercially available product is Tone-0201® (Union Carbide; Danbury, Conn.). More preferably, the composition includes about 16% of polycaprolactone diol.

The composition 14 includes from about 0.1% to about 2% by weight of a catalyst, based upon the total weight of the composition. In one embodiment, the composition includes about 0.3% of a catalyst. Preferably, the catalyst is a triflic acid. More preferably, the triflic acid is the diethylammonium salt of trifluoromethanesulfonic acid $(CF_3SO_3H \cdot HNCC_2H_5)_2$. A suitable commercially available product is FC 520 (Minnesota Mining and Manufacturing; Minneapolis, Minn.). Most preferably, the composition includes about 0.3% of the diethylammonium salt of trifluoromethanesulfonic acid $(CF_3SO_3H \cdot HNCC_2H_5)_2$.

The composition 14 includes from about 0.1% to about 5% by weight of an adhesion promoter, based upon the total weight of the composition. In one embodiment, the composition includes about 0.5% of an adhesion promoter. Preferably, the adhesion promoter is a titanate compound. More preferably, the titanate compound is titanium N tetrakio-(bis 2-tropenolatomethyl)-1-butanolato adduct (2 moles) di-tridecycl hydrogen phosphate. A suitable commercially available product is KR 55® (Kenrich Petrochemicals; Bayonne, N.J.). Most preferably, the composition includes about 0.5% of Kr 55®.

The composition 14 includes from about 1% to about 5% by weight of a pigment, based upon the total weight of the composition. In one embodiment, the composition includes about 2% of pigment. Preferably, the pigment is carbon black. More preferably, the carbon black is Special Black 100 (Degussa; Frankfurt, Germany). Most preferably, the composition includes about 2.1% of Special Black 100.

The composition 14 includes from about 5% to about 50% by weight of a corrosion inhibitor, based upon the total weight of the composition. In one embodiment, the composition includes about 10% of a corrosion inhibitor. Preferably, the corrosion inhibitor is Ferrophos® (Occidental Chemical; Dallas, Tex.). Ferrophos® includes iron phosphide ($Fe_2P$) and iron silicide (FeSi). More preferably, the composition includes about 9.7% of Ferrophos®.

The composition 14 includes from about 0.01% to about 2% by weight of a flow agent, based upon the total weight of the composition. In one embodiment, the composition includes about 0.1% of a flow agent. As used herein, "flow agent" means a suitable surface wetting or leveling agent. Preferably, the flow agent is a siloxane. More preferably, the siloxane is polyester modified dimethyl polysiloxane. A suitable commercially available product is Byk 310® (Byk Chemie; Wallingford, Conn.). Most preferably, the composition includes about 0.1% of Byk 310®.

The composition 14 includes from about 0.25% to about 10% by weight of an anti-sag agent, based upon the total weight of the composition. In one embodiment, the composition includes about 2% of an anti-sag agent. As used herein, "anti-sag agent" means an anit-sag rheology modifier. Preferably, the anti-sag agent is a high hydroxy-containing compound. A suitable commercially available product is Byk 405® (Byk Chemie; Wallingford, Conn.). Most preferably, the composition includes about 2% of Byk 405®.

The composition 14 includes from about 0.05% to about 5% by weight of a defoamer, based upon the total weight of the composition. In one embodiment, the composition includes about 0.3% of a defoamer. As used herein, "defoamer" means a foam destroying agent. Preferably, the defoamer is a siloxane. More preferably, the siloxane is methyl alkyl polysiloxane. A suitable commercially available product is Byk 077® (Byk Chemie; Wallingford, Conn.). If bubbles are permitted to form at any time during the application, curing or cooling process, such bubbles may produce bare spots where the coating is not present on the substrate.

The composition 14 is produced by mixing and stirring the components together at ambient conditions to form a liquid composition. The composition 14 can be applied to the carbon steel substrate 12 in any suitable manner. In one embodiment, the composition 14 is applied by dipping the substrate 12 into the liquid composition 14 at a temperature of about 60° F. to about 150° F., preferably about 100° F., for a period of at least about 10 seconds, preferably about 10 seconds to about 120 seconds. When the substrate 12 is dipped in this manner and removed from the composition 14, a continuous liquid coating of the composition 14 adheres to the surfaces and edges of the substrate 12. The composition 14 is stable in the liquid phase and so can be applied by dipping the substrate therein in a high rate production process. The composition 14 includes substantially no volatile organic compounds, and thus does not emit such compounds into the air. The composition 14 also includes substantially no heavy metals.

The coated substrate is heated at an elevated temperature to cure the composition 14. For example, the coated substrate can be heated at a temperature of at least about 250° F. for a period of about 30 minutes, or at a temperature of at least about 350° F. for a period of about 15 minutes. Thus, the coated member 10 includes the substrate 12 of carbon steel and an outer coating of the cured composition 14. The cured composition includes a reaction product provided by thermally curing the composition. The coating has a thickness of only about 1–2 mils, and thus requires less material to form a suitable coating than would a wax-based composition.

The coating is resistant to moisture, and thus prevents corrosion of the carbon steel substrate. The coating is hard and resistant to being scraped off the substrate. The coating also possesses sufficient impact resistance to withstand repeated impacts without chipping or cracking. The coating also is stable when exposed to elevated temperatures and different weather conditions.

The following example is offered to illustrate the utility of the invention, and is not to be construed as limiting the scope of the specification or claims.

EXAMPLE

A composition including about 64% of 3,4 epoxycyclohexymethyl-3,4 epoxycyclohexane-carboxylate, about 5% of Riechhold 8076 Fineclad® polyester powder, about 16% of polycaprolactone diol, about 0.3% of the diethylammonium salt of trifluoromethanesulfonic acid $(CF_3SO_3H \cdot NHCC_2H_5)_2$, about 2.1% of carbon black, about 9.7% of Ferrophos®, about 0.1% of Byk 310® flow agent, about 2% of Byk405® anti-sag agent, and about 0.3% mixing and stirring the components together at ambient conditions to form a liquid composition. The composition was applied to a carbon steel substrate by dipping the substrate into the liquid composition. The composition was thermally cured by heating the coated substrate at about 350° F. for a period of about 15 minutes. The resultant coating of the cured composition had a thickness of only about 1–2 mils. The coating was resistant to moisture, hard, impact-resistant, and stable when exposed to a temperature of about 600° F. for a period of about 1 hour.

What is claimed is:

1. A coating composition for preventing corrosion of a substrate including corrodable material, said coating composition being a liquid which is applied to the substrate by dipping the substrate therein, said coating composition comprising:

about 64% of 3,4 epoxycyclohexymethyl-3,4 epoxycyclohexane-carboxylate;

about 5% of a polyester compound in the form of powder;

about 0.3% of the diethylammonium salt of trifluoromethanesulfonic acid $(CF_3SO_3H \cdot HNCC_2H_5)_2$; and about 16% of a polyol.

2. A coating composition as set forth in claim 1, wherein said polyol is selected from the group consisting of; di-functional polyols, tri-functional polyols, and combinations thereof.

3. A coating composition as set forth in claim 2, wherein said polyol is polycaprolactone diol.

4. A coating composition as set forth in claim 1, wherein said polyester compound is a mixture of polyester compounds having an average molecular weight of about 14,000 and including hydroxy functional groups.

5. A coating composition as set forth in claim 1, and further comprising about 10% of a corrosion inhibitor.

6. A coating composition as set forth in claim 5, wherein said corrosion inhibitor includes iron phosphide and iron silicide.

7. A coating composition as set forth in claim 5, and further comprising a compound selected from the group consisting of adhesion promoters, pigments, flow agents, anti-sag agents, defoamers and combinations thereof.

8. A coating composition as set forth in claim 7, wherein said adhesion promoter is a titanate compound.

9. A coating composition as set forth in claim 7, wherein said pigment is carbon black.

10. A coating composition as set forth in claim 7, wherein said flow agent is a siloxane compound.

11. A coating composition as set forth in claim 7, wherein said anti-sag agent is high hydroxy containing compound.

12. A coating composition as set forth in claim 7, wherein said defoamer is a siloxane compound.

* * * * *